(No Model.) 2 Sheets—Sheet 1.
C. A. BEHLEN.
VEHICLE SPRING.
No. 403,506. Patented May 21, 1889.
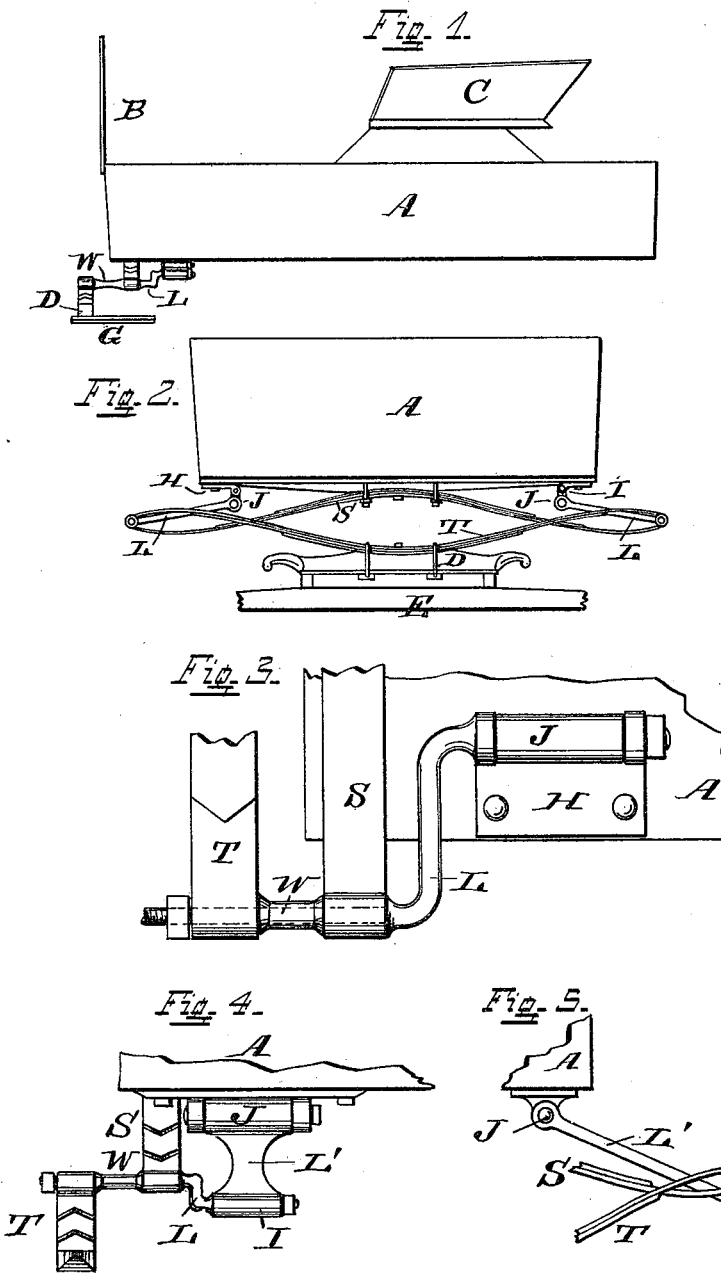

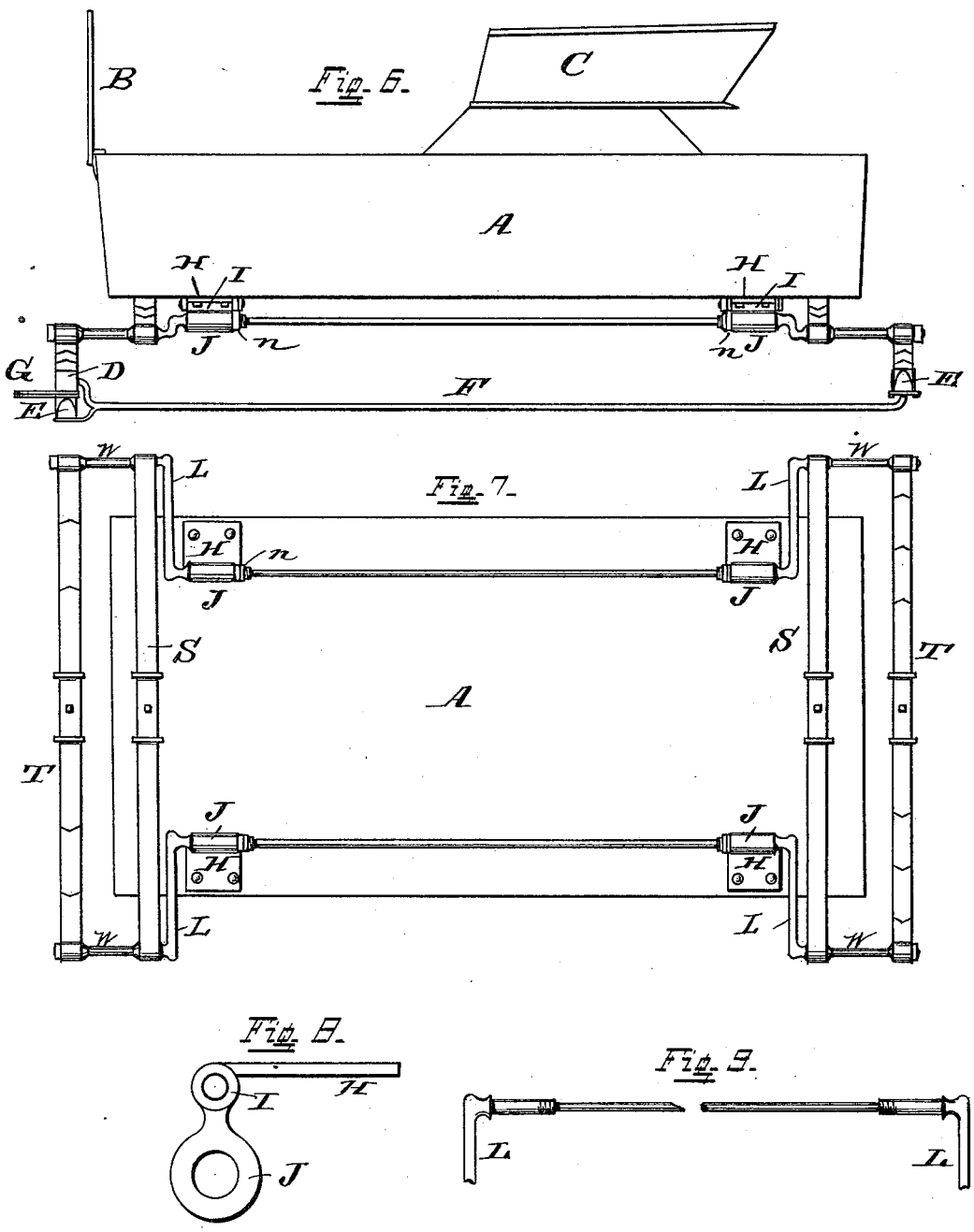

UNITED STATES PATENT OFFICE.

CHARLES A. BEHLEN, OF CINCINNATI, OHIO.

VEHICLE-SPRING.

SPECIFICATION forming part of Letters Patent No. 403,506, dated May 21, 1889.

Application filed March 15, 1889. Serial No. 303,366. (No model.)

*To all whom it may concern:*

Be it known that I, CHARLES A. BEHLEN, a citizen of the United States, residing at Cincinnati, in the county of Hamilton and State of Ohio, have invented a certain new and useful Improvement in Vehicle-Springs, of which the following is a specification.

The object of my invention is to hang a vehicle-body, especially that of the piano-box variety, low, so as to have a clear view of all sides of the vehicle, affording at the same time easy riding without that pitch and side motion so prevalent at the present day.

My invention can be applied to all vehicles using the elliptic variety of springs, and it also can be used to take the place of side bars, which, though improving the looks of the vehicle as now constructed, are objectionable in that they are stiff-riding and require a good deal of space when a turn is necessary to be made.

The features and advantages of my improvement will be understood from the description which I will herein give and by reference to the accompanying drawings, forming part of my application, in which—

Figure 1 is a side view of a vehicle-body having my improvement attached. Fig. 2 is an end view of same. Fig. 3 is an enlarged view of the parts, showing the method of their attachment to the under side of the vehicle-body. Fig. 4 is also an enlarged view of the parts, the arrangement of which, however, differs from those shown in Figs. 1 and 2 in that the swiveling and elongation of the springs take place at their ends instead of at the point where the loop is fastened to the body. This is made apparent in Fig. 5, which is an end view of Fig. 4. Fig. 6 is a view similar to Fig. 1, differing, however, from the latter in that the body guard-iron is carried and extended the length of the vehicle instead of stopping short at the point of fastening, as indicated in Fig. 1. This construction in some cases may be more desirable than the other, for it tends to offer additional strength and support for the body and springs, at the same time counteracting and equalizing the motion from either end. Fig. 7 is an under side view of Fig. 6, the perch being removed. Fig. 8 is an enlarged view of the swivel-coupling. Fig. 9 is a view of the full-length rod or body guard-iron shown in Figs. 6 and 7.

A represents the vehicle-body; B and C, respectively, the dash-board and seat.

D is the head-block and axle-bed.

F, Fig. 6, is the perch, while G is the fifth-wheel.

H are hinge-plates attached to the under side of the vehicle-body, near each corner thereof. Connected to these hinge-plates are barreled couplings I J, which are integrally united. Into the barrel J is inserted the inner end of loop L, the jointure being in the nature of a swivel, where it is held by means of nut $n$ or equivalent. The loop L is in the form of crank or elbow, and to its outer end are attached the springs S T by running that stem of the loop through the spring-eyes when the parts are held in position by nuts or equivalent means. These springs consist of two semi-elliptic portions, one being attached to the head-block, the other occupying a reversed position and attached to the under side of the body by clips, as shown, one spring being in front of the other, as before stated. As also stated, the outer stem of the loop L passes through the spring-eyes, and the semi-elliptic portions are separated from each other by the washers W, which may be long or short, according to the width of separation desired.

Instead of having the elongation of the crank L at point of attachment under the body, as shown in the first three figures, the coupling may be changed so as to permit the ends of each spring to be loosely united to it, as seen in Figs. 4 and 5. This may be done by lengthening the space between the barrels I J, the integral link being indicated by the letter L'. The elbow of the loop L is consequently shortened, one end thereof entering the barrel I, the other supporting the springs S T and washer W in the usual manner. This method of attachment will produce the same action as the method of attachment shown in the first three figures, only it is effected from a different standpoint. The lengthening of link L' of the coupling serves as the equivalent of the long elbow of loop L.

As indicated in Figs. 6 and 7, the loops or body guard-iron on each side of the body, instead of being cut short at point of attachment or shackling, may be continued and run the entire length of the body, they being shackled at both ends, and the parts being held in their relative positions, as shown. In this case the shackle or coupling is first slipped on the rod in a split condition and then welded.

From this description and an inspection of the drawings it will be evident that a vehicle provided with my springs, constructed and hung in the manner shown and described, will be free from the swaying and jolting movements which are so unpleasant at the present time. In addition to this, strength and durability are added to simplicity, and much is obtained from an artistic point of view.

What I therefore claim, and desire to secure by Letters Patent, is—

1. In a vehicle, the semi-elliptic springs S T, occupying relatively-reversed positions, one being attached to the head-block, the other to the under side of the body, in combination with loops L, one end supporting extremity of springs, which are separated from one another by washer W, the other end being swiveled into a hinged and barreled coupling underneath the vehicle-body, substantially as shown and described, and for the purposes noted.

2. The body A and loops L on each corner thereof, said loops being loosely connected to a hinged and barreled coupling, in combination with two semi-elliptic springs occupying relatively-reversed positions, and in such shape fastened, respectively, to the head-block or axle-bed and vehicle-body, their extremities being mounted on the outer loop-stem and separated from one another by washer W, substantially as shown and described, and for the purposes specified.

3. In a vehicle, the body A, loops L, properly shackled to body and supporting spring portions S T, and washer W, the said loops extending the length of the vehicle-body, with barreled couplings I J, connected by an elongated link, L', through the instrumentality of which the springs can be elongated or contracted, substantially as shown and described.

CHARLES A. BEHLEN.

Witnesses:
HARRY KOKING,
J. WM. JOHNSON.